United States Patent
Gardt et al.

(10) Patent No.: US 11,007,991 B2
(45) Date of Patent: May 18, 2021

(54) DEVICE FOR CONTROLLING A SOLENOID VALVE

(71) Applicant: Robert Bosch GmbH, Stuttgart (DE)

(72) Inventors: Andrej Gardt, Abstatt (DE); Valentin Schubitschew, Tamm (DE); Volker Edelmann, Buchen (DE)

(73) Assignee: Robert Bosch GmbH, Stuttgart (DE)

( * ) Notice: Subject to any disclaimer, the term of this patent is extended or adjusted under 35 U.S.C. 154(b) by 240 days.

(21) Appl. No.: 16/114,727

(22) Filed: Aug. 28, 2018

(65) Prior Publication Data
US 2019/0077387 A1    Mar. 14, 2019

(30) Foreign Application Priority Data

Sep. 11, 2017 (DE) ............. 10 2017 215 997.9
Sep. 11, 2017 (DE) ............. 20 2017 105 499.3

(51) Int. Cl.
*B60T 13/66* (2006.01)
*B60T 15/02* (2006.01)
(Continued)

(52) U.S. Cl.
CPC ............. *B60T 13/662* (2013.01); *B60T 8/00* (2013.01); *B60T 8/36* (2013.01); *B60T 13/686* (2013.01);
(Continued)

(58) Field of Classification Search
CPC . B60T 13/662; B60T 8/00; B60T 8/36; B60T 13/686; B60T 15/028; B60T 15/36
(Continued)

(56) References Cited

U.S. PATENT DOCUMENTS 5,404,303 A * 4/1995 Pattantyus .......... B60T 8/17616
                                                      701/78
6,250,286 B1 * 6/2001 Hoenig ............... F02D 41/20
                                                      123/490
(Continued)

FOREIGN PATENT DOCUMENTS

DE    198 33 830 A1    2/2000
DE    10 2015 219 506 A1    4/2017
KR    101894103 B1 *    8/2012

OTHER PUBLICATIONS

Google patents machine translation of KR 101894103 B1.*
(Continued)

*Primary Examiner* — Jean Paul Cass
(74) *Attorney, Agent, or Firm* — Maginot, Moore & Beck LLP

(57) ABSTRACT

A device for controlling a solenoid valve that controls the through-flow of a medium in a closed-loop manner includes a control procedure implemented by the device. The control procedure is configured at least in regions as a ramp function. The ramp starts with a ramp start current intensity that is less than an opening start current intensity of the valve at which the valve starts to open. The ramp ends with a ramp end current intensity that is greater than an opening end current intensity at which the valve is fully open. The device is configured to one or more of determine and adjust an amount of the ramp start current intensity in dependence upon a pressure. The amount determined and/or adjusted takes into consideration a pressure of the medium against which the solenoid valve opens.

11 Claims, 2 Drawing Sheets

(51) Int. Cl.
  *B60T 13/68* (2006.01)
  *B60T 15/36* (2006.01)
  *B60T 8/36* (2006.01)
  *B60T 8/00* (2006.01)
  *B60W 10/04* (2006.01)

(52) U.S. Cl.
  CPC ............ *B60T 15/028* (2013.01); *B60T 15/36* (2013.01); *B60W 10/04* (2013.01)

(58) Field of Classification Search
  USPC .......................................................... 701/70
  See application file for complete search history.

(56) References Cited

U.S. PATENT DOCUMENTS

| | | | | |
|---|---|---|---|---|
| 6,322,166 | B1* | 11/2001 | Furuya | B60T 8/36 251/129.05 |
| 7,336,470 | B2* | 2/2008 | Satoh | H01F 7/1844 361/160 |
| 7,784,881 | B2* | 8/2010 | Engelmann | H01H 47/325 303/119.1 |
| 9,061,672 | B2* | 6/2015 | Hakiai | B60L 1/003 |
| 9,640,311 | B1* | 5/2017 | Kordik | H01F 7/1844 |
| 9,701,288 | B2* | 7/2017 | Okano | B60T 8/367 |
| 10,145,883 | B2* | 12/2018 | Scholl | B60T 8/36 |
| 10,650,621 | B1* | 5/2020 | King | H04L 67/10 |
| 2006/0091728 | A1* | 5/2006 | Fulks | B60T 7/22 303/193 |
| 2010/0151989 | A1* | 6/2010 | Read | B60K 6/12 477/4 |
| 2012/0080249 | A1* | 4/2012 | Yates, III | B60L 7/18 180/65.31 |
| 2016/0207418 | A1* | 7/2016 | Bergstrom | B60G 3/08 |

OTHER PUBLICATIONS

Google patents machine translation of Russian Patent Application Pub. No. RU20358U1 to BA that was filed in 2001 (hereinafter "the 358 publication").*

* cited by examiner

DEVICE FOR CONTROLLING A SOLENOID VALVE

This application claims priority under 35 U.S.C. § 119 to patent application nos. DE 10 2017 215 997.9, filed on Sep. 11, 2017 in Germany, and DE 20 2017 105 499.3, filed on Sep. 11, 2017, the disclosures of each of which are incorporated herein by reference in their entirety.

BACKGROUND

The present disclosure relates to a device for controlling a solenoid valve that controls the through-flow of a medium in a closed-loop manner, wherein the control procedure is configured at least in regions as a ramp function, wherein the ramp starts with a ramp start current intensity that is less than an opening start current intensity of the valve at which the valve starts to open and wherein the ramp ends with a ramp end current intensity that is greater than an opening end current intensity at which the valve is fully open, wherein the device is configured in such a manner that said device determines and/or adjusts an amount of the ramp start current intensity in dependence upon the pressure, wherein said amount is determined and/or adjusted taking into consideration a pressure of the medium against which the solenoid valve opens. Furthermore, a hydraulic brake system is provided.

Solenoid valves have the task in the hydraulic unit of retaining or allowing the pressure medium to flow out. Hydraulic brake systems typically comprise multiple solenoid valves. The solenoid valves are generally designed in such a manner that depending upon the function a continuous setting is achieved in a de-energized switching position (by way of example normally "closed") and the valve is only energized for a short-term operation (by way of example energized "open"). In the case of solenoid valves (MV) in ABS/TCS/ESP systems in motor vehicles, specific requirements for the closed state are placed on the opening rate and also on the noise behavior, which are dependent upon the respective task of the MVs in the system.

The prior art discloses by way of example normally closed valves that so as to open rapidly are controlled for a short time with a high current (opening current) so that they open. A control procedure of this type is illustrated in FIG. 1a. If the valve is to be opened quietly, it is also possible to provide a current ramp. A control procedure of this type is illustrated in FIG. 1b.

SUMMARY

In contrast to this, the device in accordance with the disclosure advantageously renders it possible to switch a solenoid valve slowly and quietly and as a consequence it is possible to improve the NVH behavior (noise-vibration-harshness) of the solenoid valve.

This is rendered possible by means of the features of the disclosure. Further embodiments of the disclosure are the subject matter of the subordinate claims.

The device in accordance with the disclosure for controlling a solenoid valve that controls the through-flow of a medium in a closed-loop manner, wherein the control procedure is configured at least in regions as a ramp function, wherein the ramp starts with a ramp start current intensity that is less than an opening start current intensity of the valve at which the valve starts to open and wherein the ramp ends with a ramp end current intensity that is greater than an opening end current intensity at which the valve is fully open, is characterized in that the device is configured in such a manner that said device determines and/or adjusts an amount of the ramp start current intensity in dependence upon the pressure, wherein said amount is determined and/or adjusted taking into consideration a pressure of the medium against which the solenoid valve opens.

This is understood to mean that the device is configured in such a manner that the amount of the ramp start current intensity is determined in dependence upon the pressure, wherein the ramp start current intensity is determined in dependence upon a pressure of the medium against which the solenoid valve opens. Any increase from a first current value at a first point in time to a greater second current value at a second later point in time is to be understood as a ramp with regard to the ramp function. In particular, this ramp may extend in a linear manner over time. However, other functions are naturally also conceivable. A device of this type is by way of example a control unit for controlling the solenoid valves. Control units or control functions of this type may also be integrated into a control unit of an ESP system and/or an ABS system. An embodiment of this type may be implemented by way of example by means of a control circuit, by way of example by means of an application-specific integrated circuit (ASIC).

In an advantageous manner, the procedure of varying the current intensity at the start of the current ramp (ramp start current intensity) in dependence upon the pressure produces a flat-line current ramp. In other words, the current ramp has a slight gradient. As a result, it is possible to reduce the magnetic force of the armature at the end of the opening procedure (in comparison to a hitherto control procedure in which only the ramp end current intensity is varied in dependence upon the pressure). The excess force (which is understood to be the magnetic force minus the closing spring/pressure force) is furthermore very low. As a consequence, the valve switches slowly and quietly. The pulse caused by the impact of the armature against the pole core is likewise low. As a result, the noise-vibration-harshness (NVH) ratio of the valve is improved.

In one advantageous embodiment, the device for controlling a solenoid valve is characterized in that the device is configured in such a manner that said device determines and/or adjusts an amount of the ramp end current intensity in dependence upon the pressure.

This is understood to mean that the device renders it possible to vary both the ramp start current intensity and also the ramp end current intensity in dependence upon the pressure. In an advantageous manner, the combination of a pressure-dependent ramp start current intensity and a ramp end current intensity produces the optimum gradient and consequently the lowest possible amount of excess force and pulse.

In one possible embodiment, the device for controlling a solenoid valve is characterized in that the device is configured in such a manner that said device determines and/or adjusts an amount of the ramp end current intensity in dependence upon the temperature.

This is understood to mean that the device also renders it possible to vary the ramp end current intensity in dependence upon the temperature. In an advantageous manner, it is possible by taking this into account to further optimize the gradient of the current ramp and the NVH behavior.

In a preferred embodiment, the device for controlling a solenoid valve is characterized in that the device is controls a normally closed high pressure switching valve.

This is understood to mean that the device is embodied and configured so as to control a normally closed high pressure switching valve in a hydraulic brake system, by way of example in an ESP system. The solenoid valve is controlled by means of the device in the case of such a valve in particular as the valve is being opened. The embodiment of the device renders it possible in an advantageous manner to optimize the pulse of the moving armature as said armature impacts against the pole core at the end of the opening procedure.

In an alternative development, the device for controlling a solenoid valve is characterized in that the device renders possible a procedure of controlling the solenoid valve which is performed in regions as a ramp function and in regions as a dynamic function, wherein in particular the control procedure is performed initially as a ramp function and subsequently as a dynamic function.

This is understood to mean that the solenoid valve is controlled by means of a current flow that corresponds in a defined region to a ramp function and in a further region to a dynamic function. A combination of a ramp function and a dynamic function renders it possible in an advantageous manner to open the valve as quietly as possible in all closed-loop control cases (by means of controlling the valve in accordance with the ramp function) and to provide a sufficient safety buffer for special cases, such as by way of example in the case of a valve that is jammed, increased friction, etc. (by means of controlling the valve in accordance with a dynamic function).

In one advantageous embodiment, the device for controlling a solenoid valve is characterized in that the device renders it possible to control the solenoid valve by means of a flat-line current ramp.

This is understood to mean that the device is configured in such a manner that said device a procedure of controlling the valve with a ramp-shaped progression of the current intensity, wherein this ramp comprises a slight gradient. This renders possible in an advantageous manner a low magnetic force at the end of the opening procedure. Furthermore, the armature of the solenoid valve moves slowly as a result. In an advantageous manner, this leads to an optimization of the NVH behavior.

In one possible development, the device is characterized in that the device renders possible a procedure of controlling the solenoid valve in such a manner that when the ramp end current intensity is achieved an excess force of the valve is as small as possible.

This is understood to mean that means are provided and/or the device is configured in such a manner that as a consequence a control procedure is performed in which the excess force (to be understood to be the magnetic force minus the closing spring/pressure force) at the end of the current ramp is very low. As a consequence, the valve switches slowly and quietly. The pulse caused by the impact of the armature against the pole core (and consequently the noise that occurs) is likewise small.

In one advantageous embodiment, the device for controlling a solenoid valve is characterized in that the device renders it possible to switch the valve from the closed state into the open state during the ramp function of the control procedure.

This is understood to mean that the start and end points of the ramp—in other words the ramp start current intensity and the ramp end current intensity—are defined and implemented in such a manner by means of the device that the valve is switched prior to the ramp end current intensity being achieved. The valve is therefore already fully open when the end of the ramp function is achieved.

Furthermore, in accordance with the disclosure, a hydraulic brake system is provided in a motor vehicle, said system having a solenoid valve with a magnet assembly that comprises an electric coil that may be energized by means of a control procedure, wherein the electric coil in the energized state generates a magnetic force that is dependent upon the current and drives the valve armature, wherein the valve armature urges a closing element during a closing movement in the direction of a valve seat and during an opening moving raises said closing element from the valve seat, wherein the control procedure is configured at least in regions as a ramp function, wherein the ramp starts with a ramp start current intensity that is less than an opening start current intensity of the valve at which the valve starts to open and wherein the ramp ends with a ramp end current intensity that is greater than an opening end current intensity at which the valve is fully open, wherein the brake system is characterized in that means are provided and configured so as to determine and/or adjust an amount of the ramp start current intensity, wherein said amount is determined and/or adjusted taking into consideration a pressure of the medium against which the solenoid valve opens.

With a view to implementing and configuring the mentioned means, reference is made to the previous description of the device. In so doing, it is possible by way of example for a device (such as the mentioned ESP control unit) to be understood as such a means. Alternatively and in particular, a controller (such as the mentioned ASIC) is also naturally to be understood as such a means that is configured in a corresponding design so as to determine and/or adjust the amount of the ramp start current intensity. The advantages that may be achieved by means of the disclosure are also already described in the description.

In an advantageous embodiment, the hydraulic brake system is characterized in that means are provided and configured that ascertain the pressure of the medium against which the solenoid valve opens.

This is understood to mean in particular pressure sensors that are integrated into the hydraulic brake system. Furthermore, it is however also conceivable to ascertain the pressure by means of evaluating further variables, such as by way of example the adjustment travel per time period, etc. In addition to the means for ascertaining the fluid pressure, it is furthermore also advantageously possible to provide and configure means that ascertain a temperature and determine the ramp end current intensity according to the temperature. In so doing, both means for ascertaining the fluid temperature and also alternatively means for ascertaining the external temperature are conceivable.

BRIEF DESCRIPTION OF THE DRAWINGS

It is to be noted that the features that are listed individually in the description may be combined with one another in any manner that is technically expedient and demonstrate further embodiments of the disclosure. Further features and expediency of the disclosure are disclosed in the description of exemplary embodiments with reference to the attached figures.

In the figures.

DETAILED DESCRIPTION

Figure 1A:
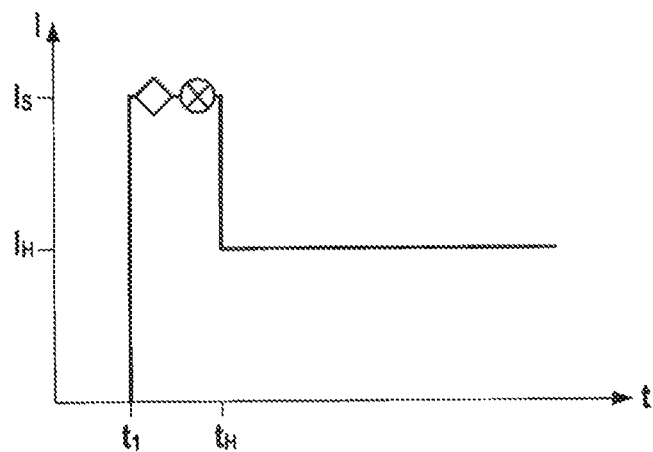
FIG. 1a illustrates a valve control procedure known from the prior art in accordance with a dynamic function.

FIG. 1a illustrates a valve control procedure known from the prior art in accordance with a dynamic function. In this case, the control procedure produces a maximum current value $I_s$ immediately following a point in time $t_1$. The maximum current value, the so-called safety current intensity $I_s$ is selected so as to be such an amount that the desired opening rate and also a safety condition for opening the solenoid valve is achieved. The illustrated diamond shape indicates the point in time at which the valve starts to open. The maximum current value $I_s$ is maintained. The illustrated cross in the circle indicates the point in time at which the valve is completely open. Once the valve has been completely opened, the current intensity at the point in time $t_h$ is reduced to the desired holding current intensity $I_H$ in order to hold the normally closed valve in the open position.

Figure 1B:
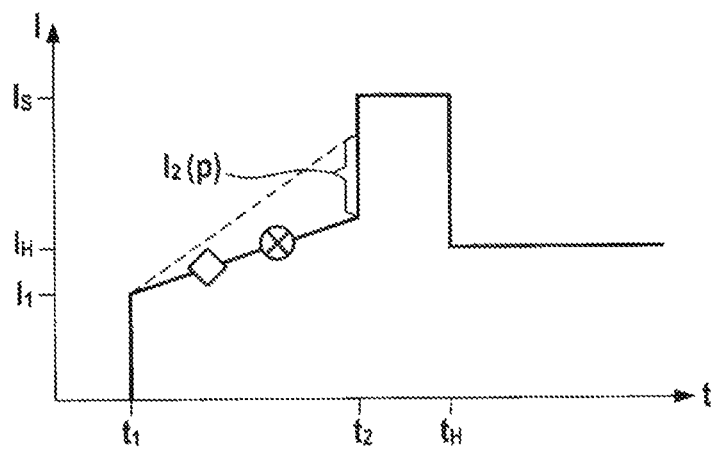
FIG. 1b illustrates a valve control procedure known from the prior art in accordance with a ramp function followed by a dynamic function.

FIG. 1b illustrates a valve control procedure known from the prior art in accordance with a ramp function followed by a dynamic function. This procedure is to render it possible to open said valve more quietly. For this purpose, a ramp start current intensity $I_1$ is adjusted initially at the point in time $t_1$. The current $I_1$ at the start of the current ramp is generally of such an intensity that the valve is not yet open in the case of each counter pressure. During the progression of time, the current intensity increases in a ramp-shaped manner until the end value ramp end current intensity $I_2$ is achieved at the point in time $t_2$. This end value may be variably defined and adjusted. The amount of the end value ramp end current intensity $I_2(p)$ that is required to open the valve is defined by the prevailing pressure in the system. The current intensity $I_2(p)$ therefore depends upon the pressure above which the valve must open. The ramp end current intensity $I_2$ that is required for the valve to open is therefore to be determined so as to be of such an intensity that this is always sufficient in order to open the valve when the corresponding pressure is present. FIG. 1b illustrates a first current intensity progression by means of a continuous ramp line (for a first possible ramp end current intensity) and a second current intensity progression by means of a broken ramp line (for a second possible ramp end current intensity). The dependency of the ramp end current intensity $I_2$ on the pressure renders possible a flat-line ramp increase. The current when a valve is completely open is therefore not much greater than the current when the valve starts to open. Furthermore, the excess force when the armature impacts against pole core is less in the case of a flat-line current ramp than in the case of a steep current ramp.

Furthermore, following the ramp function, a dynamic function is performed in which the maximum current value, the so-called safety current intensity L is set. This renders possible a safety buffer by means of which it is ensured that the valve is actually opened even taking into consideration all possible eventualities. When the holding point in time $t_H$ has been achieved, the current may be reduced to the holding current value $I_H$.

Furthermore, the figure illustrates by means of a diamond shape the point in time at which the valve starts to open and in turn the fully open valve is indicated by the cross in the circle. The object in this case is that the valve switches during the ramp control procedure (in other words the valve achieves its end position). Furthermore, as a result of the ramp function, the current (or the magnetic force) when the armature impacts against the pole core is not as great as when the switching procedure occurs with a high current. The switching noise is accordingly quieter.

Figure 2:
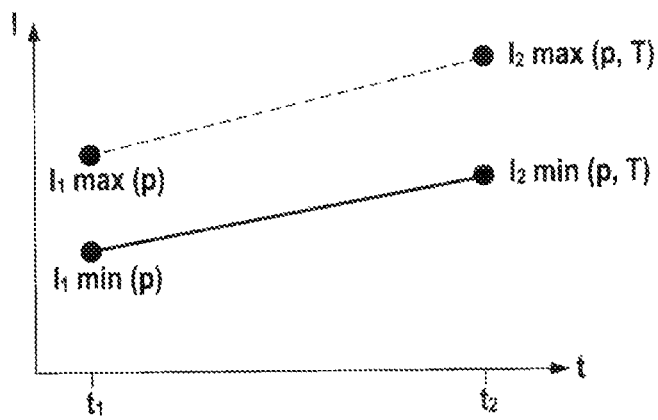
FIG. 2 illustrates a valve control procedure (section ramp function) that is possible using the device and is in accordance with one embodiment of the disclosure.

FIG. 2 illustrates a possible embodiment of the device in accordance with the disclosure for the valve control procedure. The figure illustrates possible ramp functions. The figure illustrates a minimum ramp function (continuous line) and a maximum ramp function (broken line). The figure naturally only illustrates a section of the valve control procedure which includes by way of example a ramp function and a dynamic function. The ramp start current intensity $I_1$ in accordance with the disclosure is dependent upon the pressure. FIG. 2 illustrates by means of $I_1\min(p)$ a minimum ramp start current intensity for the point in time $t_1$. Furthermore, the figure illustrates by means of $I_1\max(p)$ a maximum ramp start current intensity. Commencing from this start, the current intensity continues to develop in a ramp-shaped manner until it achieves a ram end current intensity $I_2$ at a point in time $t_2$. FIG. 2 illustrates in turn by means of $I_2\min(p, T)$ a minimum ramp end current intensity and also by means of $I_2\max(p,T)$ a maximum ramp end current intensity. In other words, the ramp end current intensity in the illustrated exemplary embodiment is dependent upon the pressure and the temperature.

Figure 3:
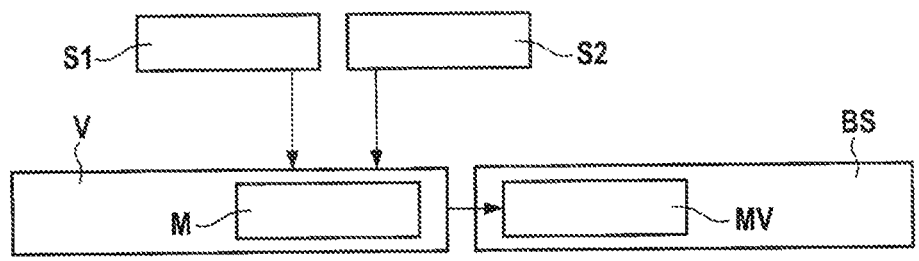
FIG. 3 illustrates a schematic view of the device in accordance with one embodiment of the disclosure and the relationship to other components.

Furthermore, FIG. 3 illustrates a schematic view of the device V in accordance with one embodiment of the disclosure and the relationship to other components. The device V in the figure is configured as an ESP control unit. The device V may control one or multiple solenoid valves MV in a hydraulic brake system BS of a vehicle. The device V comprises means M. The means M support and/or render possible the procedure of controlling the solenoid valve MV. A means M is configured for this purpose by way of example as an ASIC. Furthermore, the means M render it possible to determine and adjust the ramp start current intensity and/or the ramp end current intensity. Furthermore, a pressure sensor S1 is provided. Information from the pressure sensor S1 may be received by the device V and processed. Furthermore, a temperature sensor S2 is provided and information from said temperature sensor is likewise processed by the device V. The sensors S1 and S2 may be a part of the hydraulic brake system BS. It is likewise conceivable that the hydraulic brake system BS comprises the device V.

What is claimed is:

1. A device for controlling a solenoid valve that controls the through-flow of a medium in a closed-loop manner, comprising:
    a controller configured to:
        operate the solenoid valve to open by causing a current to be applied to the solenoid valve, the applied current including, in at least one region, a ramp current, the ramp current (i) starting with a first current intensity that is less than a current intensity at which the valve starts to open and (ii) ending with a second current intensity that is greater than a current intensity at which the valve is fully open; and
        determine the first current intensity based on a pressure of the medium against which the solenoid valve opens.

2. The device for controlling a solenoid valve according to claim 1, wherein the controller is configured to determine the second current intensity based on the pressure.

3. The device for controlling a solenoid valve according to claim 1, wherein the controller is configured to determine the second current intensity based on a temperature.

4. The device for controlling a solenoid valve according to claim 1, wherein the solenoid valve is a normally closed high pressure switching valve.

5. The device for controlling a solenoid valve according to claim 1, wherein the applied current includes, in at least one region, a dynamic current function.

6. The device for controlling a solenoid valve according to claim 5, wherein the applied current includes, initially, the ramp current and, subsequently, the dynamic current.

7. The device for controlling a solenoid valve according to claim 1, wherein the ramp current of the applied current is a flat-line current ramp.

8. The device for controlling a solenoid valve according to claim 1, wherein the second current intensity is such that, when the second current intensity is achieved, an excess force of the solenoid valve is as small as possible.

9. The device for controlling a solenoid valve according to claim 1, wherein the controller is configured to switch the solenoid valve from the closed state into the open state during the ramp current of the applied current.

10. A hydraulic brake system in a motor vehicle, comprising:
   a solenoid valve with a magnet assembly that comprises an electric coil configured to be energized via a control procedure implemented by a device, wherein the electric coil in the energized state generates a magnetic force that is dependent upon a current and drives a valve armature of the solenoid valve, wherein the valve armature urges a closing element during a closing movement in a direction of a valve seat and during an opening movement raises said closing element from the valve seat,
   a controller configured to:
     operate the solenoid valve to open by causing a current to be applied to the solenoid valve, the applied current including, in at least one region, a ramp current, the ramp current (i) starting with a first current intensity that is less than a current intensity at which the valve starts to open and (ii) ending with a second current intensity that is greater than a current intensity at which the valve is fully open; and
     determine the first current intensity based on a pressure of the medium against which the solenoid valve opens.

11. The hydraulic brake system according to claim 10 further comprising:
   a pressure sensor configured to ascertain the pressure of the medium against which the solenoid valve opens.

* * * * *

UNITED STATES PATENT AND TRADEMARK OFFICE
CERTIFICATE OF CORRECTION

Page 1 of 1

PATENT NO. : 11,007,991 B2
APPLICATION NO. : 16/114727
DATED : May 18, 2021
INVENTOR(S) : Gardt et al.

It is certified that error appears in the above-identified patent and that said Letters Patent is hereby corrected as shown below:

In the Claims

Column 7, Line 9 should read:
--one region, a dynamic current.--

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*